United States Patent
Midgley et al.

(10) Patent No.: US 6,460,055 B1
(45) Date of Patent: Oct. 1, 2002

(54) SYSTEMS AND METHODS FOR BACKING UP DATA FILES

(75) Inventors: Christopher Midgley, Framingham; John Webb, Sutton; Ted Hess, Hudson; John Acott, Shrewsbury; Tom Hansen, Leominster; Brian Wilson, Holliston, all of MA (US)

(73) Assignee: LiveVault Corporation, Marlborough, MA (US)

( * ) Notice: Subject to any disclaimer, the term of this patent is extended or adjusted under 35 U.S.C. 154(b) by 0 days.

(21) Appl. No.: 09/465,485

(22) Filed: Dec. 16, 1999

(51) Int. Cl.[7] .............................................. G06F 17/30
(52) U.S. Cl. ........................ 707/204; 707/8; 707/202; 709/236; 711/162; 713/176; 714/4; 714/5
(58) Field of Search .................... 707/1, 8, 10, 100, 707/200–206, 103 R, 104.1; 709/212, 214, 219, 249, 221, 228, 236; 711/111, 112, 114, 162; 714/4, 5, 6, 20, 21; 713/176

(56) References Cited

U.S. PATENT DOCUMENTS

| | | | | |
|---|---|---|---|---|
| 4,751,635 A | * | 6/1988 | Kret .............................. | 707/10 |
| 5,043,871 A | * | 8/1991 | Nishigaki et al. ............ | 707/202 |
| 5,572,709 A | * | 11/1996 | Fowler et al. ................. | 703/27 |
| 5,574,898 A | * | 11/1996 | Leblang et al. ................ | 707/1 |
| 5,649,200 A | * | 7/1997 | Leblang et al. ............. | 707/203 |
| 5,675,802 A | * | 10/1997 | Allen et al. .................. | 707/203 |
| 5,754,782 A | * | 5/1998 | Masada ....................... | 707/102 |
| 5,758,359 A | * | 5/1998 | Saxon ........................ | 707/204 |
| 5,764,972 A | * | 6/1998 | Crouse et al. ................. | 707/1 |
| 5,794,563 A | * | 8/1998 | Klepac ..................... | 119/51.11 |
| 5,920,701 A | | 7/1999 | Miller et al. ................ | 709/228 |
| 5,931,947 A | * | 8/1999 | Burns et al. ................ | 713/201 |
| 5,991,772 A | * | 11/1999 | Doherty et al. ................ | 707/1 |
| 5,999,947 A | * | 12/1999 | Zollinger et al. .............. | 707/1 |
| 6,000,020 A | * | 12/1999 | Chin et al. .................. | 370/401 |
| 6,023,709 A | * | 2/2000 | Anglin et al. .................... | 707/2 |
| 6,023,710 A | * | 2/2000 | Steiner et al. .............. | 707/204 |
| 6,038,665 A | * | 3/2000 | Bolt et al. .................. | 707/204 |
| 6,044,367 A | * | 3/2000 | Wolff .............................. | 707/1 |
| 6,052,695 A | * | 4/2000 | Abe et al. .................... | 707/201 |
| 6,088,694 A | * | 7/2000 | Burns et al. ................... | 707/10 |
| 6,185,601 B1 | * | 2/2001 | Wolff ......................... | 709/105 |
| 6,189,016 B1 | * | 2/2001 | Cabrera et al. ............. | 707/201 |
| 6,199,074 B1 | * | 3/2001 | Kern et al. .................. | 707/200 |
| 6,216,051 B1 | * | 4/2001 | Hager et al. ................. | 700/121 |
| 6,240,527 B1 | * | 5/2001 | Schneider et al. ............. | 714/21 |
| 6,269,381 B1 | * | 7/2001 | St. Pierre et al. ................ | 707/1 |
| 6,269,431 B1 | * | 7/2001 | Dunham ..................... | 707/204 |

FOREIGN PATENT DOCUMENTS

WO          WO 98/54662       * 12/1998       ........... G06F/17/30

OTHER PUBLICATIONS

Wolfson, Ouri et al., "Distributed Algorithms For Dynamic Replication Of Data", Proceedings of the 11th ACM–SIGMOD–symposium on Principles of Database Systems, Jun. 1992, pp. 149–163.*

* cited by examiner

*Primary Examiner*—Hosain T. Alam
*Assistant Examiner*—Shahid Alam
(74) *Attorney, Agent, or Firm*—Kevin A. Oliver; Foley Hoag LLP

(57) ABSTRACT

The invention provides systems and methods for continuous back up of data stored on a computer network. To this end the systems of the invention include a synchronization process that replicates selected source data files data stored on the network and to create a corresponding set of replicated data files, called the target data files, that are stored on a back up server. This synchronization process builds a baseline data structure of target data files. In parallel to this synchronization process, the system includes a dynamic replication process that includes a plurality of agents, each of which monitors a portion of the source data files to detect and capture, at the byte-level, changes to the source data files. Each agent may record the changes to a respective journal file, and as the dynamic replication process detects that the journal files contain data, the journal files are transferred or copied to the back up server so that the captured changes can be written to the appropriate ones of the target data files.

19 Claims, 6 Drawing Sheets

SYSTEMS AND METHODS FOR BACKING UP DATA FILES

FIELD OF THE INVENTION

The invention relates to systems and methods for maintaining back up files for servers on a computer network, and more specifically, to systems and method for continuously backing up data files stored on a computer network.

BACKGROUND OF THE INVENTION

Computer networks have been remarkably successful at processing, communicating and storing of vast amounts of data. As companies today become more accustomed to storing important company information on their data network, the value of these networks and the data they store continues to grow. In fact, many companies now identify the data stored on their computer network as their most valuable corporate asset. Accordingly, it is an important function of a network administrator to, from time to time, backup to a long term storage medium, the data on the corporate network.

Today most backup systems operate by having the network administrator identify a time of day during which little or no network activity occurs. During this time the network administrator turns the network over to a backup system and the data files stored on the computer network are backed up, file by file, to a long term storage medium, such as a tape backup system. Typically the network administrator will backup once a week, or even once a day, to ensure that the back up files are current.

Although such a backup process may work well to create a copy of the data stored on the network, it is a time consuming and labor intensive process. Moreover, it is a cumbersome process that often is inappropriate in many environments. For example, as more and more computer networks begin to operate twenty-four hours a day seven days week, it is continuously more difficult for the system administrator to identify a block of time during which the majority of network resources may be turned over to the backup procedure. Moreover, as computerized network systems begin to store more information as well as information that changes regularly during the course of the work day, the value of a backup system which only backups once a week or once a day is fairly reduced. In fact many companies now rely on the corporate network to store almost all of its business information, and the loss of even a portion of the information stored on the network during the course of a day may result in a substantial cost for the company. Accordingly, systems which only backup periodically are of a reduced value to a company.

Moreover, although the current backup systems work well for putting data on to a long term storage media system, they often store data sequentially on to media, like a magnetic tape, losing the file structure of the data, and making it difficult to retrieve information without having to reinstall all the data previously stored on the tape. Thus, if a portion of the data is lost, it is often difficult to restore just the data that was lost, and often the system administrator is forced to decide whether it is worth the cost of retrieving the lost portion of the data.

Accordingly, there is a need in the art for backup systems that are less obtrusive, may continuously update the data stored on a network, and make it more facile for a system administrator to retrieve data, or portions of data, stored to a computer network.

SUMMARY OF THE INVENTION

The systems and methods described herein provide for continuous back up of data stored on a computer network. To this end the systems of the invention include a synchronization replication process that replicates selected source data files data stored on the network to create a corresponding set of replicated data files, called the target data files, that are stored on a back up server. This synchronization replication process builds a baseline data structure of target data files. In parallel to this synchronization process, the system includes a dynamic replication process that includes a plurality of agents, each of which monitors file access operations for a server on the network to detect and capture, at the byte-level, changes to the source data files. Each agent may record the changes to a respective journal file, and as the dynamic replication process detects that the journal files contain data, the journal files are transferred or copied to the back up server so that the captured changes can be written to the appropriate ones of the target data files.

More particularly, in one aspect the invention provides a system for creating backup files for data files stored on a computer network. Such a system comprises a backup server that has storage for a plurality of data files, a data server having a source data file and an agent operating on the data server and capable of capturing changes to the source data file as the source data file is being modified and capable of recording detected changes within a journal file. The system can further comprise a synchronization replication process for replicating the source data file to create a target data file stored on the backup server, and a dynamic replication process that is responsive to data within the journal file for altering the target data file to mirror changes made to the source data file.

In one embodiment the agent may comprise a process such as a computer process that is capable of monitoring a file access operation that occurs on the data server for determining whether the source data file is open. To this end, the agent may comprise a file system filter (FSF) process that can detect file input and output calls to or through the operating system. Therefore the agent may monitor file access operations to record byte level modifications to the source data file, and these byte level modifications may be recorded within the journal file as modifications made to the source data file. The agent may also include a time stamp mechanism for providing a time stamp to the journal file thereby indicating the time of recording the modifications to the source data file. Additionally, this file system filter can be utilized to allow the agent process to have unrestricted access to all files on the source system, regardless of how the applications have tried to restrict access. This means even if the applications open the file in a share restricted manner, the file system filter will allow the agent process access to this file.

The synchronization replication process may include an image capture mechanism that can process a file system or data structure on the server and create a file system image signal that is representative of the state, or a state, of the file system at a particular time. For example, the image capture mechanism can include a directory processor that can process a directory structure such as a conventional UNIX file system or windows NT file system directory structure, to create a directory image signal which is representative of a state of the directory at the time of processing that directory structure. In one embodiment the image generator operates by processing metadata associated with a data structure or file structure such as the size of the data structure, the size of directory, the name to the files and directory, the metadata associated with the last time the directory was edited, or when it was created, the number of files in the directory, and other such metadata. A hashing process or cyclical redundancy check (CRC) process may be applied to the metadata to come up with an identifier that is uniquely, or substantially uniquely, representative of the state of the processed file structure at the time of the processing. A similar image generator process may be employed for processing a file system on the server to create a file system image signal that is representative of a state of a file, directory, or the data within a file. In either case, the image signal is representative of a state of the file structure, such as the directory, a group of files in a directory, a particular file, or even a particular portion of a file.

In one embodiment the dynamic replication process may include a process for monitoring a journal file and in response to detecting that changes have been recorded within a journal file, delivering the journal file to the backup server. The dynamic replication process may also include a process for amending the target data file as a function of the dynamic change signal by writing the changes in the journal file to the target data file.

The dynamic replication process may also include a write order controller that is responsive to the time stamp signal for controlling the order in which recorded changes are written to the target data file. Accordingly, the systems and methods described herein control the order in which changes are written to the target data files, thereby ensuring that in case of an interruption in service, the target data file will have been amended to correspond to an actual version of the source data file.

Additionally, in one embodiment the systems described herein may include a policy manager for allowing a user to identify a set of source data files to be monitored by the synchronization mechanism and the dynamic replication mechanism. The policy manager may allow a user to set up policies including the timing of synchronization backups, the manner in which the dynamic replication mechanism operates, such as in a continuous mode, or in a periodic mode. The policy manager may also allow the user to identify the manner in which updates are to occur, such as by having the synchronization mechanism employ a file level update process wherein the rewriting of a target data file includes rewriting the current version of the corresponding source data file as the new version of the target data file, or alternatively, wherein the synchronization mechanism would write recorded changes to a target data file to bring the target data file into agreement with the most recent version of the corresponding source data file.

Accordingly, in another embodiment the invention provides a computer system for allowing a system administrator, user, or other operator to create backup files for data files stored on the computer network. The system may comprise a backup server having storage for a plurality of data files and a data server that has a plurality of data files organized into a file structure, and an agent that operates on the data server and that is capable of capturing changes to the data files as the data files are being modified and is also capable of recording detected changes within a journal file. This system can also have a console process that allows the user, system administrator, or another party to select one or more of the plurality of data files for identifying the selected data files as source data files which are to be backed up by the system. To this end, the system would also include a synchronization replication process that would replicate each of the source data files to create the respective target data file stored on the back up server, and would include a dynamic replication process that would be responsive to data stored within the journal file, and would employ that data for altering each of the target data files to mirror changes made to respective ones source data files. Accordingly, such a system allows a system administrator employing the console process to identify those data files on a computer network which were to be replicated for backup purposes. To this end the console process can include a file selection process that allows the user to create a profile file representative of the source data files that are selected to be backed up. The console process can also include a timing selection process for allowing the user to control the timing of the dynamic replication process. The console process can further include, in an alternative embodiment, a process for allowing the user to identify which files are to be included or excluded from the synchronization process.

In a further embodiment, the system may also include a transactional process. The transactional process may allow a user such as a system administrator to identify a set of source data files that are to be grouped together. The transactional process can therefore control the synchronization replication process such that the synchronization replication process will back up the identified set of source data files as a single transaction. In this way, the system administrator can identify a set of files which are to be backed up together, thereby providing transactional integrity for the backup process that is to encompass a plurality of different files.

In another aspect, the invention can be understood as a process for creating backup files for a plurality of data files stored on a server on a computer network. The process may comprise selecting at least one of the plurality of data files on the server as a source data file that is to be replicated as a target data file on the backup server. In a further action, the process may synchronize the source data file on the server with the target data file on the backup server by replicating each of the source data files as a target file on the backup server, and for each source data file the process may monitor server activity to identify associated file access operations that occurs on the data server and recording detected changes within in a journal file. In another action, the process may write detected changes recorded in the journal file to respective ones of the target data file, for maintaining the target data files as replicated copies of the source data files. In this process, selecting the data files can include grouping two or more of the files together into a transactional set and identifying for the transactional set a transaction status which is representative of the backup state of this group of data files. Further when synchronizing the source data files, an image signal may be generated for a data structure on the server that is associated with the source data files mounted therein, wherein the image signal is representative of a state of the data structure. The process for generating the image signal may include applying a hash process, CRC process, or other suitable process to metadata associated with the data structure. The metadata may comprise the size of the files and the directories, the size of the directory, the names of the directories, the names and files in the directories, the date and time information associated with the creation of the directory or source file in the directory or the time in which files were edited in the directory and the open or close status within the directory. The synchronizing mechanism may than build an image signal for the data structure that is representative of a portion of the directories maintained on the server, and may compare the image signal to a corresponding image signal that is either stored or created on the backup server to detect a change in the state of the data structure or in the state of a portion of the data structure. This can happen at the directory level, the file level, the data block level, and the byte level.

In parallel with the synchronization process, the dynamic replication process may proceed wherein as source data files are modified, the changes are written into a journal file by an agent process operating on an associated server, and the journal file entries are transmitted to the backup server where the changes may be written to the corresponding target data files. In writing the changes the system can identify safe points that are noted within the journal file or otherwise provided to the backup server. The safe point may be representative of a marker for indicating a set of changes that may be written to the associated target file. A safe point can be generated in response to detecting that a source data file has been closed or has been inactive for a period of time, or for any other suitable reason that indicates that a group of changes may be written to a target data file. Additionally, the safe point signal may be employed by the system for determining when to store an amended target data file to a long term memory device such as a tape system.

In another aspect the invention may be understood as systems and methods for creating backup files for data files stored on the computer network that employ bandwidth management systems for controlling the network bandwidth resources employed during a backup process. Specifically, the systems and methods described herein could include systems for creating backup files that have a backup server for storing copies of source files stored on a data server on the computer network, a backup process for transmitting source files stored on the data server to the backup server for creating a copy file on the backup server, and a bandwidth control process for monitoring transmission of data by the backup process for controlling the weight of delivery of data from the data server to the backup server, thereby controlling network bandwidth usage. The system may also include a data server that has an agent operating on the data server for capturing changes to a stored source file and for transmitting the captured changes to the backup server at a rate that is controlled by the bandwidth control process. This system can provide a user interface that will allow the user to select a network consumption limit that is representative of the users selected limit for the amount of network bandwidth to be allocated to the backup replication process and the agent process. To this end the user interface will allow the user to specify the network consumption limit as a function of the percentage of network speed or at the rate of delivery of data from the backup server to the data server, or by any other suitable criteria. The bandwidth control process may also include a bandwidth monitoring process for determining the bandwidth resources that are available on the network and may employ the determined bandwidth resources for determining network consumption limits. The bandwidth monitoring process may monitor SNMP trap to determine bandwidth availability and other similar signals that are available for determining the amount of bandwidth resources that the backup process may consume.

In an additional embodiment, the systems and methods described herein include a backup process that monitors other available network resources, such as buffer resources, to determine the amount of buffer resources available on the network for the backup process. Further, as resources become dear the backup process may determine that the current backup operation is to be aborted, and restarted once network resources become more available. Additionally, the backup process may include a coalescence process which will consolidate the amount of data being transferred in journal files for reducing the demands on network resources.

In a further aspect, the systems and methods described herein can include backup systems that include a long term storage system for recording target data files to a storage medium in response to the operation of the dynamic replication process, thereby storing versions of the target file on the storage medium. Additionally, in an optional environment the systems may include a catalog process that can record metadata that is representative of the locations of the versions of the target files on the storage medium to thereby create an index for accessing these versions of the target file. The catalog process may include a mechanism for storing security metadata that is associated with the different versions of the target data files and that is representative of the users access rights for the versions of the target data file. Such information may be employed by a secure restore process for determining the access right of a party that is requesting to restore a version of a target data file, or to view a version of a target data file including the metadata such as file name, file owner, and other information, before granting the requesting party access to the stored version of the target data file.

BRIEF DESCRIPTION OF THE DRAWINGS

The foregoing and other objects and advantages of the invention will be appreciated more fully from the following further description thereof, with reference to the accompanying drawings wherein.

DETAILED DESCRIPTION OF THE ILLUSTRATED EMBODIMENTS

To provide an overall understanding of the invention, certain illustrative embodiments will now be described, including a system that allows for real-time, continuous back up of byte-level modifications to data structures stored on a computer network. However, it will be understood by one of ordinary skill in the art that the systems and methods described herein can be adapted and modified for other suitable applications, and that these additions and modifications can be made to the invention without departing from the scope hereof.

The systems methods described herein include a replication backup system that runs, optionally in parallel, a synchronization replication process and a dynamic replication process. The synchronization replication process creates a baseline image that replicates on a back up server, data structures that have been selected by the user to be backed up and the dynamic replication process monitors in real time file input/output calls associated with these data structures, to thereby capture changes being made to these data structures and making these same changes to the replicated image of these files on the backup server, to maintain the replicated data structure on the back up server as a mirror image of the data on the computer network.

Figure 1:
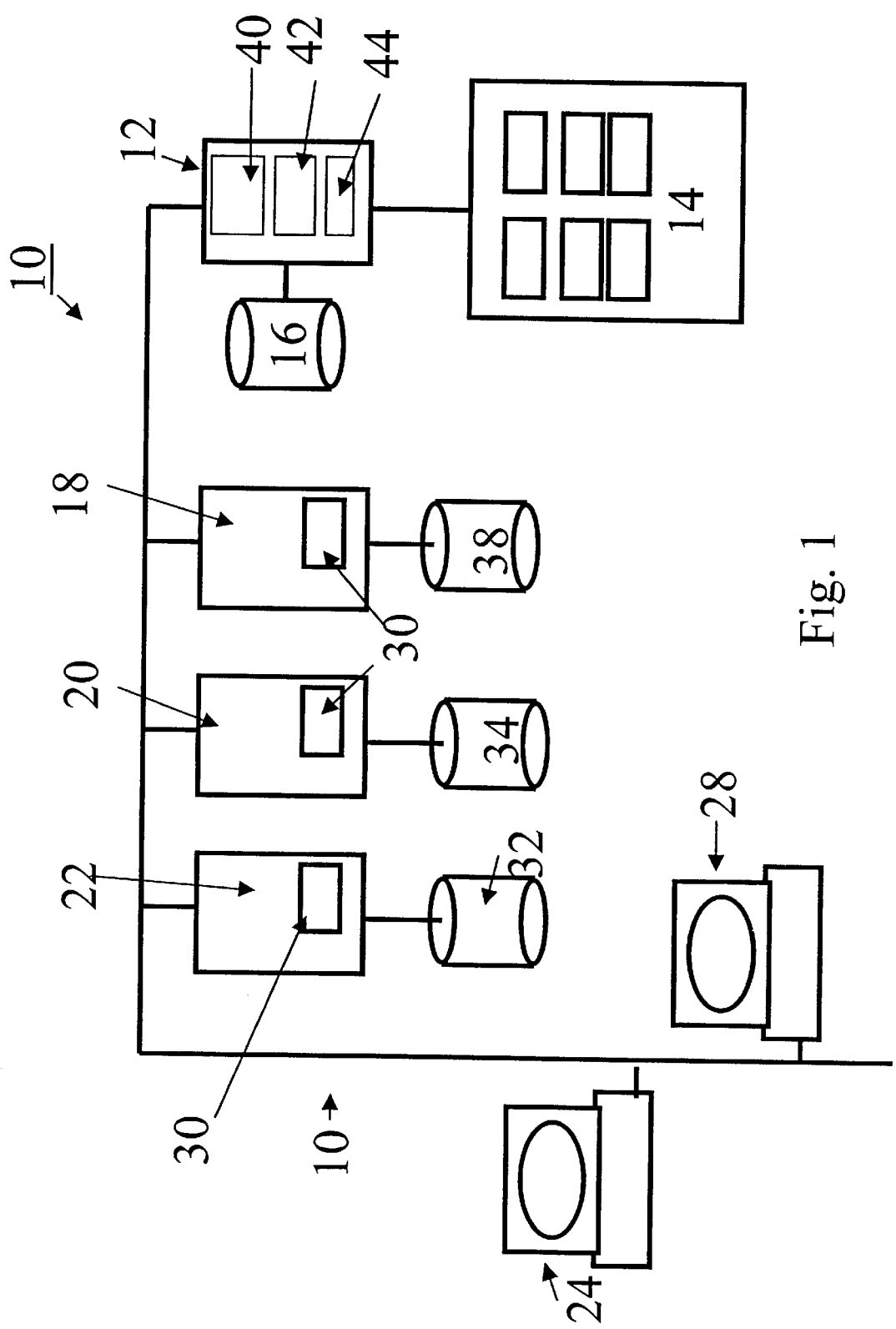
FIG. 1 depicts one system according to the invention for providing a continuous backup system that replicates selected data files stored on the computer network.

FIG. 1 depicts a system 10 that includes a replication backup system that monitors byte level changes to data files stored on a computer network. Specifically, FIG. 1 depicts a computer network system 10 that includes a backup server 12, a long-term storage system 14, a cache storage system 16, a plurality of servers 18, 20 and 22, a console 24, a network client 28, a plurality of agent processes 30, a plurality of data storage devices 32, 34 and 38, a synchronization replication process 40, and a catalog process 42. The network system 10 depicted in FIG. 1 comprises a conventional computer network system that includes clients and servers, each interconnected by a network system and each capable of exchanging information over the network. In the particular embodiment shown, the network 10 includes a plurality of separate servers, each of which has its own data storage device system. For the depicted embodiment, the exemplary servers depicted are merely representative of the types of servers that may be connected into a network such as the network 10. In this embodiment the server 18 for example would store email data in a structured format within the data storage device 38 and would provide users of the network access to the email data upon request of the user. Similarly, the server 20 and the document server 22 each may maintain a data structure within its respective data storage device and may provide read and write access to data within the data storage devices to users of the network. Accordingly, it will be understood that each of the servers 18, 20 and 22 will be maintaining data structures comprising a series of data files that are constantly being opened, updated, added to, and deleted by the network users.

To guard against losing the data stored on the network 10, the network 10 includes a backup server 12, a cache memory 16, a long term data storage device 14, and a plurality of agent processes 30, each agent process being located on one of the servers 18, 20 and 22 containing information that will be replicated by the backup data storage system. FIG. 1 depicts each server as having an associated Agent process 30, however it will be understood that other arrangements are suitable, and each server may have multiple Agents, including agents for portions of the server file system, or redundant agents for the server files system as well as agents that monitor multiple server file systems. As will be described in more detail hereinafter, the synchronization replication process 40 operates in cooperation with the agent processes 30 to create a replica of selected files maintained within the data bases 32, 34 and 38. To this end, the synchronization replication process 40 can create a replica image of selected files stored within data storage devices 32, 34 and 38, and the agent processes 30 can monitor the activities of each of the servers 18, 20 and 22 to detect when a user changes one of the imaged or replicated files. The agent process 30 can create a record of the changes made to a particular file and store that record within a journal file that keeps track of the different changes made by a user, or other entity, to a source data file. Once the dynamic replication process recognizes that a journal file contains information, the dynamic replication process can transfer the journal file to the backup server 12. The backup server 12 can employ the journal file to modify the replicated version of the source data file, otherwise known as the target data file, to thereby maintain parity between the selected source data files within the data storage devices 32, 34 and 38 and the replicated target files maintained by the backup server 12.

As can be seen from FIG. 1, the systems and methods of the invention may be integrated into a conventional computer network system that comprises conventional network elements and nodes such as client stations, work stations, printers, hubs, routers, and other conventional data network equipment. For example the depicted servers 18–22 may be conventional files servers of the type commonly employed with computer networks and can comprise a PC compatible work station running the windows NT, UNIX, or other operating system and having sufficient random access memory and persistent memory to operate efficiently as a server systems. Similarly, the client station 28 can be a conventional client workstation such as a PC compatible computer system running the windows NT or UNIX operating system or any suitable operating system. Additionally, the client station 28 can comprise an alternative client system such as a hand-held device, a stand alone client system such as a kiosks, or any other suitable client device. In FIG. 1 the network 10 is depicted as a local area network, however it will be apparent to one of ordinary skill that the systems and methods described herein can be employed with wide area network, a distributed network, including the Internet or any other suitable network system.

Additionally, the data storage devices 32–38 may be understood as stores of data, or data structures that are maintained by the servers, for use by the network users. It will be understood by those of skill in the art, that these data storage device element may be conventional database systems, as well as conventional file systems, such as the Windows NT file system, or the Unix File system, both of which have directories of data file that may be backed up by the systems described herein. Moreover, the back up systems described herein will operate with data storage devices that store different formats of data and different types of files. For example, the data storage devices may store data files, executable files, registry information, database structures and other conventional data formats and data types. Moreover, FIG. 1 shows these stores of data as local to the server, however, it will be understood that such data stores may also be distributed across a plurality of locations and devices. The data may be physically stored on any suitable memory system including a cache memory system, a random access data memory, or a persistent data memory, such as a hard disk drive, RAID system, tape drive system, floppy diskette, or any other suitable system. The system depicted in FIG. 1 depicts the data storage device devices 32, 34 and 38 as physically separate from the servers 18, 20 and 22, however, it will be understood by those of ordinary skill in the art that in other embodiments the data storage device devices can be integrated into the system 18, 20 and 22, such as an internal hard drive device.

The depicted tape library 14 may be a conventional tape library system of the type commonly employed for backing up data on a computer network. In one particular embodiment, the tape library system 14 is a blank tape library system manufactured by the Quantum corp. of Milpitas, Calif. However, it will be apparent to those of ordinary skill in the art that other tape library systems may be employed without departing from the scope of the invention.

Optionally, the tape library 14 may include a controller that performs a tape expiration process to rotate selectively the use of tapes in the library and which is based on the loader capacity of the tape library 14. Specifically backup of data to the automated tape library 14, which can be a conventional juke box device that, can happen in a manner wherein after multiple or incremental system backups, essentially all available tape space is employed. Thus there is no more blank tape available for recording information. Rather than have a human remove the tape, and automatically reuse the oldest tape, the systems and methods described herein can operate the library to provide for continuous tape back up. In this practice, data sent over the network 10 to the library 14 may employ a tape expiration technique wherein the tape holding or storing the oldest data is employed by the system for storing new data into the library 14. The controller to implement this process may be a software process operating on the back up server 12, that is capable of recording which tape in the library 14 has been employed for storing data and at what time the data was stored. The controller may store data onto each tape until the tape is full, or incapable of taking new data. Once this occurs, the controller may determine if any tapes in the library 14 are blank and available for storing data. If so the controller can select the blank tape for receiving data. Otherwise, the controller can compare the time information for each tape to identify the tape having the oldest data. That tape may then be selected by the controller for storing data. It is important to understand that although FIG. 1 depicts the system as having a single library 14, a plurality of tape libraries may also be employed. Accordingly, the expiration strategy can be employed across a plurality of tape libraries. Additionally, a plurality of different tape expiration strategies may be employed for a single tape storage library such as the tape storage library 14 depicted in FIG. 1. The tape expiration process may be employed with other types of long term storage systems, including hard disk systems, R/W cdrom, RAID systems, or any other suitable system.

The depicted backup server 12 may also be a conventional workstation system such as a Sun Sparc workstation running a version of the UNIX operating system, or a PC compatible work station running the windows operating system or any other suitable platform. The backup server 12, as will be described in greater detail hereinafter, runs a synchronization replication process 40 that creates a replicated copy of selected source data files and maintains these replicated data files as target data files that can be stored in the attached memory 16, the tape library 14, or a combination of the attached memory 16 and the tape library 14.

Figure 2:
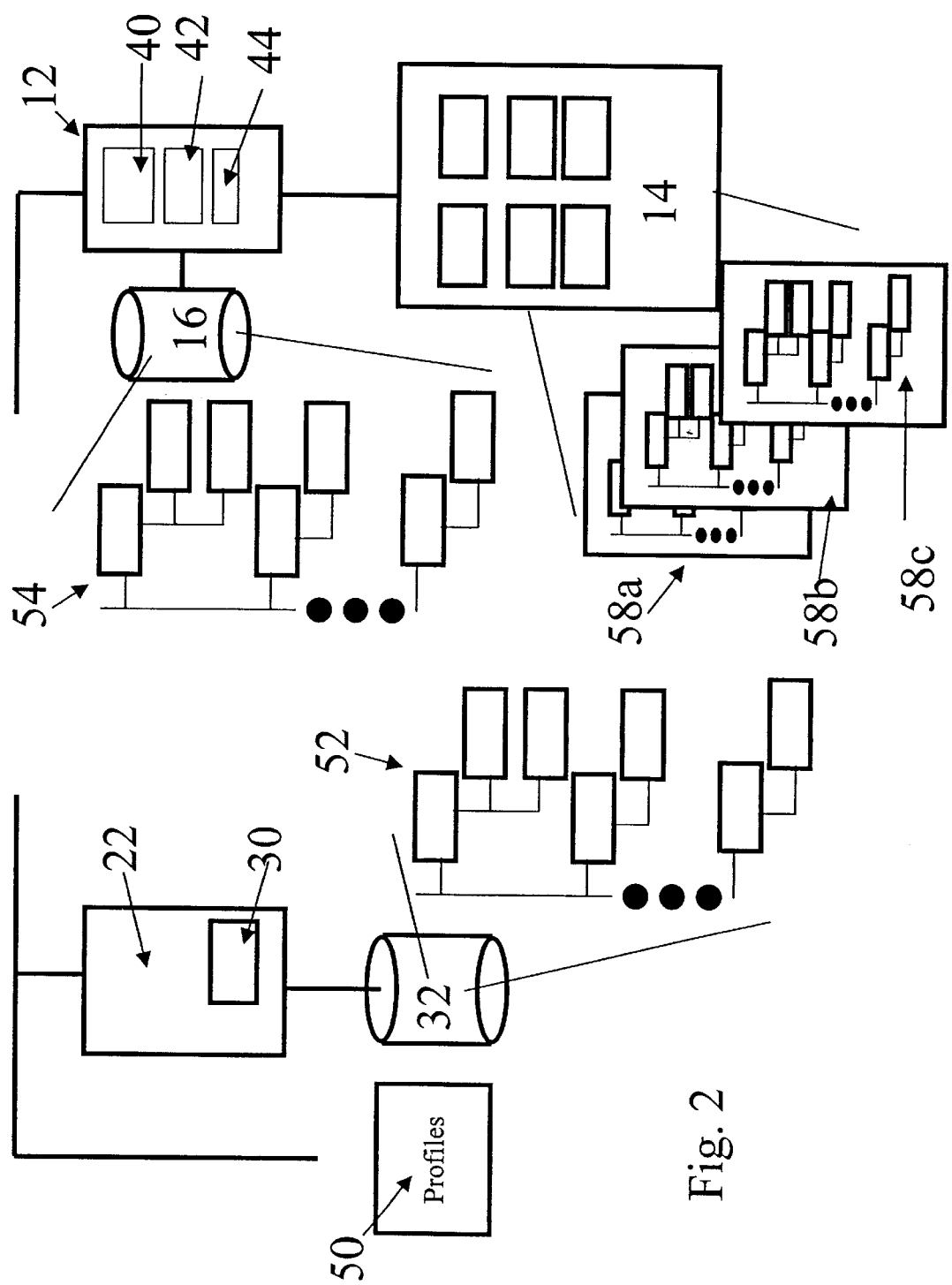
FIG. 2 depicts in more detail a replicated data structure achieved by the system depicted in FIG. 1.

FIG. 2 depicts pictorially, the replication of selected source data files from a server, in this example the server 22, within the cache memory 16 of the backup server 12. Specifically FIG. 2 depicts a data structure 52 that is stored within the data storage device 32. The data structure 52 comprises a structure of directories, subdirectories, and data files, each data file comprising bytes of data. The data structure 52 depicted in FIG. 2 is representative of a conventional data structure such as the Windows NT files system data structure or a UNIX file system data structure. The individual files may be organized according to a file allocation table, inodes, or any other suitable format. The data stored within the data structure 52 may comprise database records, application programs, basic documents such as word processor documents and spreadsheets, NT registry data, maintaining the registry hives and structure, or any other suitable data. For the example of FIG. 2 the data stored within the data structure 52 generally comprises documents under the control of the document server 22.

FIG. 2 also depicts that the cache storage device 16 of the backup server 12 stores a data structure 54 that provides a replicated copy of the data structure 52. As depicted by FIG. 2 the replicated data structure 54 follows the structure and organization of the data structure 52 in that the data structure 54 organizes data records within the data structure as those data records are organized within the data structure 52. The replicated data structure 54 also provides directories, subdirectories and data records. Thus it will be understood that the systems and methods described herein employ replication technology to backup data on a computer network, creating and maintaining an image of the backed up data from one system, the source system, to another system, the backup or target system. FIG. 2 depicts the data structure 54 as being maintained solely within the cache memory 16. However it will be understood by those with ordinary skill that the backup sever 12 can, from time to time, write all of or portions of the data structure 54 within the long term storage device 14, which FIG. 2 depicts as a tape storage library 14. FIG. 2 further depicts that tape storage library 14 maintains a plurality of versions of the replicated data structure 54. Each of the replicated versions, 58a, 58b and 58c, are representative of versions of the replicated data structure 54 at different points in time. Accordingly the long term storage device 14 may optionally maintain a plurality of different versions of the replicated data structure 54, or portions of the replicated structure 54 including multiple versions of each target file or subdirectory. Thus each replicated file structure 58a, 58b or 58c may include multiple versions of each target file within that structure, thus maintaining a complete history of the versions of the source files, including versions generated during a synchronization replication process, and all intermediate versions of files generated between synchronization operations.

FIG. 2 further depicts that the backup server 12 may include a catalog process that allows the backup server to record metadata that is representative of the locations of the different versions of the target files being stored in either cache memory or on the long term storage medium, such as the tapes. The catalog process 42 allows the backup system to create an index for accessing the different versions of the target files that are stored by the system either on long-term storage medium such as the tape medium of library 14, within the cache memory 16 or across a combination of both the cache and long term storage medium. The catalog process 42 can be a conventional computer process operating on the backup server 12 to collect information form the synchronization and dynamic replication processes to create a database of the different versions of the target files being stored. The database can include pointers to the location of the different versions of the target files on the tape, thereby providing more rapid access to the location on the tape that includes the information a user may want to restore. Optionally, the catalog process 42 can maintain within its database, which can be stored within the cache memory 16, metadata that is representative of security history information for the different versions of the target files. This security information can include user access rights information which indicates whether a particular user has had access privileges to a particular version of a target file. This function can be provided by a secure restore process that allows the backup server 12 to determine the access rights of a party that is requesting to restore a version of a target data file and for comparing the access rights of that party with the access rights that have been stored in the catalog and which are associated with the version of the target file that the user is requesting to restore. By comparing the access rights of the party with the historical access rights for that file, the secure restore process can prevent an unauthorized party from viewing or restoring any of the versions of the backed-up target files. Thus for example, if a user requests a version of a data file backed-up as part of the back up process which generated the replicated target files depicted by target files 58c, the secure restore process can access the security rights for the desired file from the cache memory 16 and compare them to the access rights of the requesting user. If the requesting user fails to provide access rights that qualify that user for accessing that version of the target file, the secure restore process can prevent the user from accessing any information including for example the long file name, author, or other metadata information about that file. This security information may be recorded by the catalog process 42 for each version of the target file stored by the system. Thus for the file structure 58c depicted in FIG. 2, each of the depicted files may actually be representative of several versions of that file each of which have a been replicated and stored. The catalog process 42 may store security information for anyone, or all of, the versions of the target file associated with the file structure 58c.

As the system 10 creates a replicated image of the data structure 52, including the directory structure, the subdirectory structure, and other such information, it will be apparent to those of ordinary skill in the art that such a replicated data structure facilitates the facile retrieval of selected portions of the data backed-up by the system 10, by being able to present to the user a file structure organization of the backed-up data.

FIG. 2 further depicts that a profile file 50 is associated with the data structure 52 that is replicated by the system 10. The profile file 50 can be generated by the console system 24 depicted in FIG. 1, and includes information that identifies the data maintained by the server 22 that is to be backed-up by the system 10, as well as storing information as to how the backup process is to operate. In one embodiment the profile file 50 is a conventional computer file stored on the server 22. The profile file 50 is created by a user in a procedure where the user employs a graphical user interface to select the data files or directories, subdirectories or other data structures that are to be replicated by the system 10.

Figure 3:
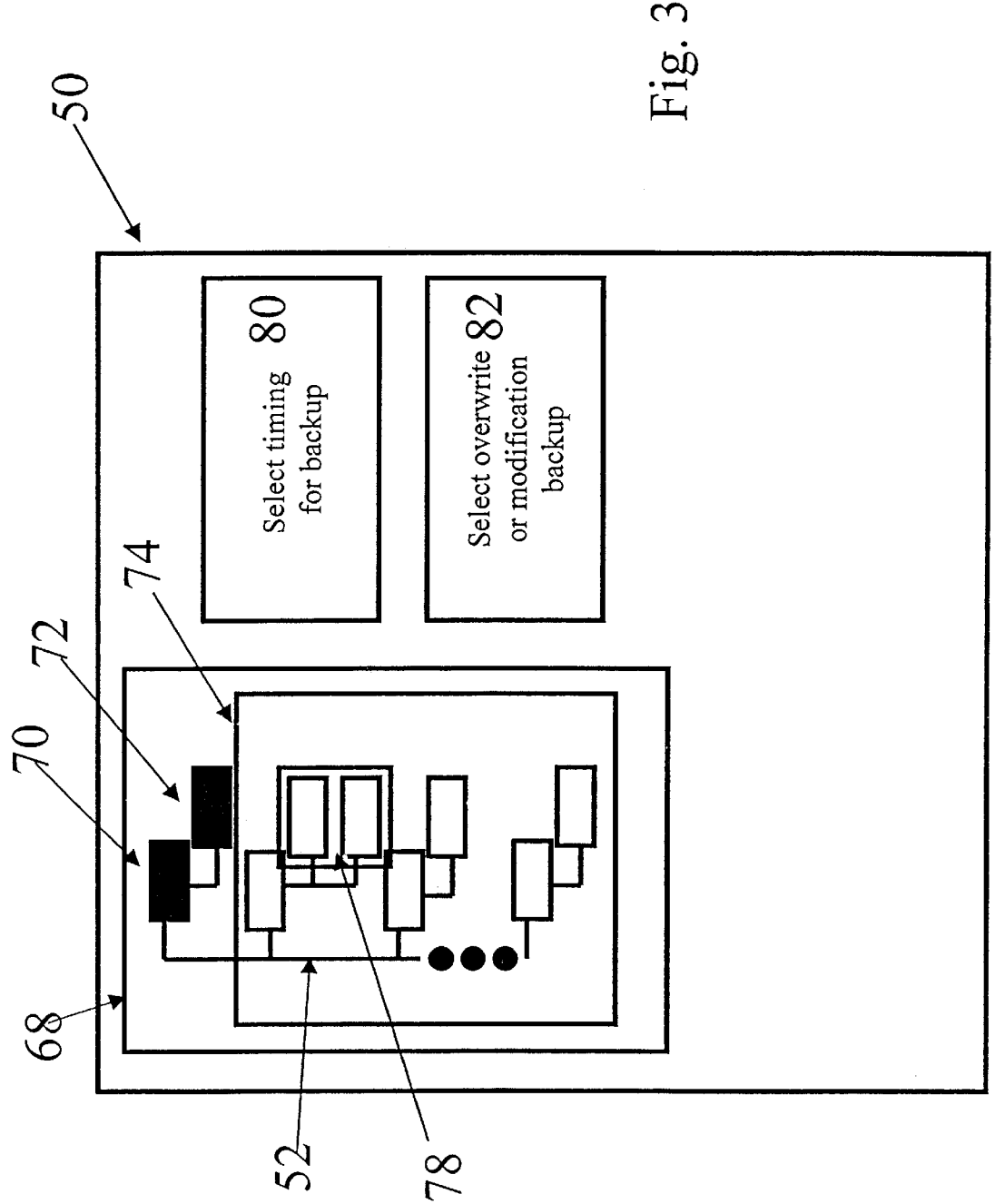
FIG. 3 depicts a profile file for use with the system depicted in FIG. 1.

FIG. 3 depicts in greater detail one example of a profile file 50. Specifically, FIG. 3 depicts a profile file 50 that includes a source data file selection field 68, a select timing field 80 and a select overwrite mode field 82. Turning to the select data field 68, FIG. 3 depicts pictorially that the profile file 50 may store in the select data field information representative of the entire file structure of the server 22, including the different files, directories, subdirectories and other file structures stored on the server 22. This file structure information may be gathered by the console process according to means known in the art, including teachings set forth in David, Solomon, *Inside Windows NT*, Microsoft Press (1998). The console process may employ this file structure information to present to a user a graphical image of the file structure of server 22, allowing the user to select those directories, subdirectories, and data files on the server 22 that are to be source data files and backed up. For example, the data source selection field 68 stores information and presents a data structure 70 that includes a plurality of data files arranged in a directory and subdirectory structure. The user may draw a box around a set of data files to be selected for being backed up. The selected files are shown representationally in FIG. 3 by the box 74 that is placed around a portion of the data structure 70. Data files that are contained within the box 74 are selected to be included within the backup process of the system 10. Those files that fall outside of the box are not selected, or are excluded from being backed up.

In a optional practice, the user can then go through and select, such as by clicking on a graphical representation of a file, separate ones of the data files to change their status as being either included or excluded from the backup process. For the embodiment of FIG. 3, it can be seen that those data files that form the data structure 52 have been selected by the user to be backed up while the data files in the data structure 72, the darkened boxes, have not been selected to be backed up and will not be replicated on the back up server 12.

FIG. 3 further depicts that the data selection field 68 may include information on source data files that are to be maintained as transactional groups. To this end, the user may employ a transactional group process to group together select ones of the data files within the data structure 52. In particular, FIG. 3 depicts a box 78, placed around two data files, to indicate that these files are to be maintained as a transactional group. Once so identified, the backup process will coordinate changes to the associated target files with the two source data files within the box 78 to thereby update these data files in concert. Once the user has identified the source data files and the transactional groups within the data source file the selected information can be stored within the profile file 50 for use by the backup process.

Similarly, the console process can allow a user to select the timing for the backup process and can store this information in a select timing for backup field 80 within the profile file 50. For example, the console process can allow the user to indicate how often a synchronization replication process is to be carried out to create a baseline set of target data files. Additionally, the console process may allow a user to identify whether dynamic replication is to occur continuously, or periodically, or according to another type of schedule or according to a set of parameters defined by the operation of the network, such as Network Bandwidth, Buffer Availability, or other network resource parameters. FIG. 3 further depicts that the profile file 50 may include a select overwrite mode field 82 wherein the method for overwriting data may be selected between a number of options. For example, the console process may allow the user to indicate during a synchronization process, a target data file that is identified as being out of synchronization with its corresponding source data file is to be overwritten by a complete new copy of the source data file. Alternatively, the user may select that only the changes between the source data file and the target data file be written to the target data file to bring the target data file into agreement with the corresponding source data file. Other information can be entered into the profile file 50 for establishing policies, and procedures for performing the backup operations. These other parameters can include identifying the types of files that are to be backed up, default paths for the target data files, whether an anti-virus scan process is to be applied to each source data file before backup, and other such directions and instructions.

Once the data source files have been identified by the user, the process backup system may employ the synchronization replication process 40 to create a replicated image of the selected data source files at the back up server 12. In one process, the backup system may first begin by creating copies of the data source files and storing them as replicated files on the back up server 12. Thus, to synchronize the data on the source and backup systems, the backup system can begin by making a copy of each source data file and storing it as a target data file on the backup server system and, optionally, writing the target data file to long term storage, such as to a tape storage media. If a file is closed, the back up system may compare the source files metadata and, may compare its contents. If the file is open, the backup system may compare the file contents. To synchronize the source data files and the target data files, the backup system replicates the changed data to the backup storage device and writes the changed data to the storage target. The change can be committed when that change is written to the storage target. As the copying of thousands of files may take time, the source data files may change during the copying process. To address this, the dynamic replication process will execute and capture file modifications to the source files being synchronized and journal them to the backup server. Once the synchronization replication process has finished processing an individual source file or a transactional group of files, the dynamic execution process may play the captured changes to the target file(s). This ensures the target file(s) are updated in a transactionally safe way, and keeps the target files as up to date as possible while still keeping them transactionally safe.

Another complication in this process is when files are moved, or renamed, from an area of the source system which is not under protection to an area of the system that is under protection. As the dynamic replication process will only capture the request to move or rename the file, the actual information for the file will not be seen by the dynamic replication process. To answer this complication, a request is made from the dynamic replication process to the synchronization replication process to move the entire contents of the moved, or renamed, file to the backup server. In this way the protected file's information, including meta data and file data, will be replicated to the backup server even when only the move, or rename, request is captured.

The synchronization replication process 40 acts to coordinate the storage targets to have the storage targets accurately reflect the source data file at the point in time of the synchronization. During this phase, two types of replication processes may be running in parallel; a synchronization replication process and a dynamic replication process. Running these processes in parallel acts to have changes made to the files during the synchronization replication process be captured and replicated on the appropriate data file, and thereby ensures transactional integrity for the files identified in the policy file 50.

To this end, the synchronization replication process 40 will replicate to the backup system 12 all the changes that have occurred on the source system since the last time a full synchronization replication process was completed. For example, if a source data file was deleted, the corresponding data file will be marked as deleted in the backup system. If a new source data file has been created or newly identified as a source data file, then it now qualifies for backup, and that file will be replicated to the backup server 12. The synchronization replication may either replicate only the changed portions of a file or may replicate the entire changed file, either as the replication deems most efficient or as directed by a policy parameter in the profile file 50. When replicating only changed portions, only those changed portions of the file are written to a journal file on the server. The journal files act as temporary files created and employed by the backup system for the intermediate storage of data changes. The journal files may then be transferred to the backup server. On the backup server 12 the changes are then written into the corresponding target data file so that the latest backup copy, or image data structure, matches with the current source data files. When replicating a full file, the entire source data file is copied to the backup system to overwrite the corresponding target data file on the backup system.

Figure 4:
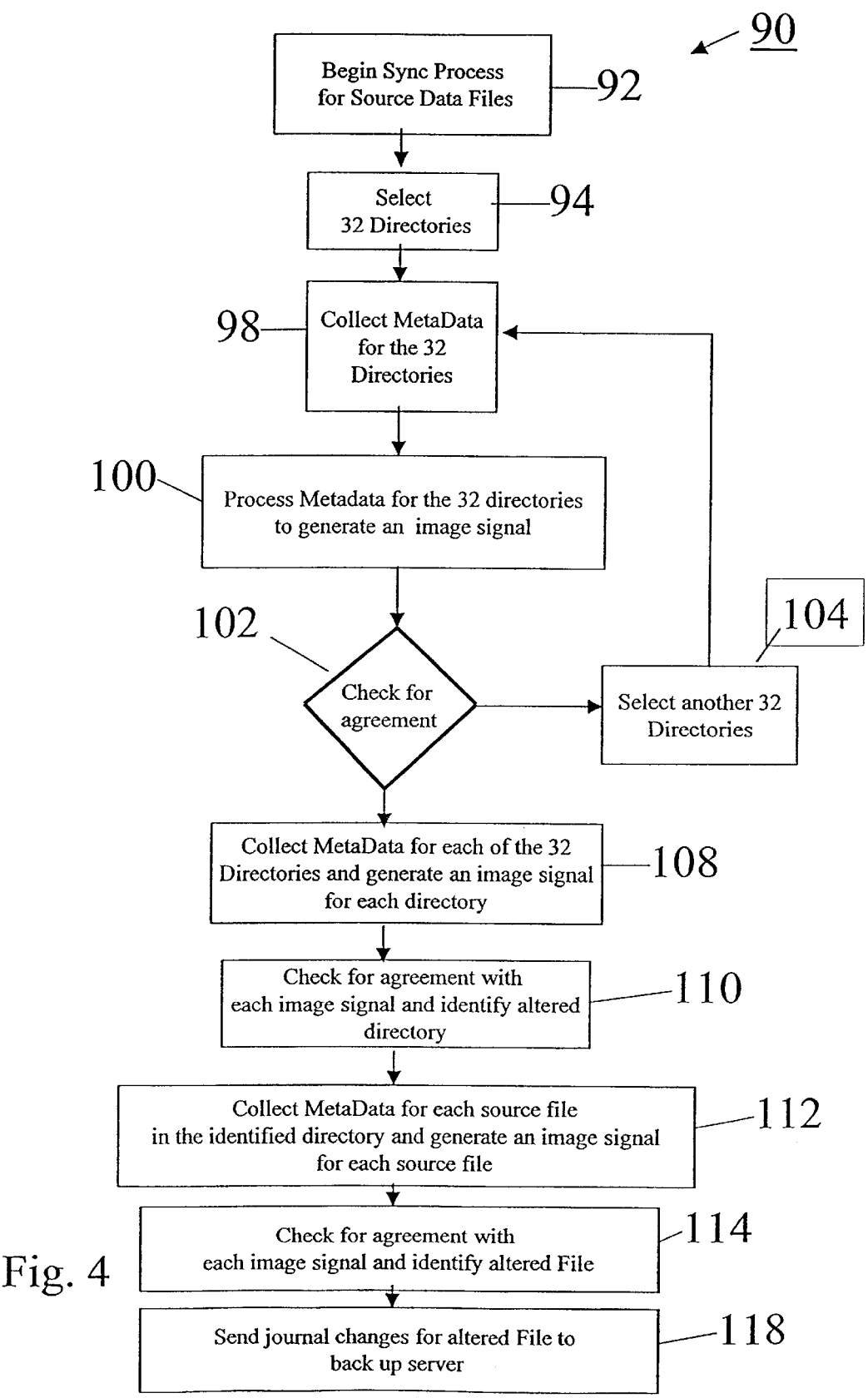
FIG. 4 depicts a data flow diagram that illustrates one process for synchronizing identified source data files with target data files to create a baseline data structure at the backup server.

To identify source data files that have been changed, the backup server 12 employs a synchronization replication process that scans the source data files to identify source data files that have been altered or changed. FIG. 4 depicts one embodiment of such a process for scanning the data source files to identify changed data source files.

Specifically, the process 90 depicted by FIG. 4 begins with a step 92 wherein the synchronization replication process for the source data files is commenced by the backup system. The process 90 proceeds to step 94 wherein the synchronization replication process selects a set of directories that include source data files identified by the user. In the practice depicted by process 90, the process 90 in step 94 selects thirty-two (32) directories for processing. The process 90 then proceeds to step 98 wherein meta data for the 32 directories is collected. In optional practices collecting meta data for the 32 directories encompasses scanning these directories for the files which qualify based on the users specifications. Meta data for these files are then used to generate a CRC representing the state of that file. This meta data can include the directory names, the size of the directories, how many files are within the directories, time and date information for when the directories were created, edited, or otherwise changed, the number of bytes stored within the directories, a timer date stamp for the last time a file was changed within the directory, and the open state of the file. Other meta data can be collected by the process 90 for characterizing the state of the 32 directories.

After step 98 the process 90 proceeds to step 100 wherein the meta data for the 32 directories is processed to generate an image signal representative of a state of the 32 directories. To process the meta data, the backup system may apply a hashing algorithm, a cyclical redundancy check algorithm, or any other suitable process for generating an image signal that may be representative of the state of the 32 directories.

Once the image signal is generated, the process 90 may proceed to step 102 wherein the backup system may employ the image signal to check for agreement with a corresponding image signal that may be generated from the corresponding 32 directories in the replicated data structure on the backup server 12. As shown in FIG. 4, in step 102 agreement can be checked for, to the extent that agreement is reached, the process 102 may proceed to step 104 and select another 32 directories for processing. Accordingly, the process 90 would proceed back to step 98 wherein meta data for another 32 directories would be collected, and processed in step 100 and checked again in step 102. This processing may continue until an image signal is found which fails to agree with a corresponding image signal generated, or stored with, the replicated data structure maintained by the backup server 12. Upon this event, the process 90 proceeds to step 108. In step 108, the process 90 can collect metadata for each of the 32 directories and generate an image signal for each of these directories. In step 110, the process 90 will check for agreement between each of the image signals and a corresponding image signal generated from or stored with the replicated data structure on the backup server 12. In this way, the process 90 may identify which of the 32 directories includes the altered data source file.

Once the directory has been identified the process 90 may proceed to step 112 wherein the process 90 collects meta data for each source file in the identified directory and generates an image signal for each of these source files. In another practice, not shown in FIG. 4, the process may collect metadata for each source file in the directories prior to collecting data for the directories in step 98. Other similar modifications and sequences may be practiced without departing from the scope of the invention.

Again in step 114 a similar process may be performed wherein agreement is checked for with each image signal of an associated source data file against an image signal generated from, or stored in association with, a corresponding target data file. Upon checking for agreement, the process 90 may identify the altered source data file. Once the source data file that has been altered is identified the process 90 may proceed to step 118 wherein the journal changes for the altered file may be transferred to the backup server 12 for writing changes to the corresponding target data file and thereby bringing the target data file into synchronization with the associated source data file. In an alternative practice, the process 90 can overwrite the target data file with the contents of the source data file for bringing the target data file into agreement with the source data file. Other techniques for coordinating the source data file and the target data file may be practiced with the systems and methods described herein without departing from the scope of the invention.

In parallel with the synchronization replication process, such as the synchronization replication process 90 depicted in FIG. 4, the backup system may employ a dynamic replication process that operates to detect changes that take place during the synchronization phase and replicate those changes to the corresponding target data files on the backup server 12. To this end the dynamic replication process may identify changes to the file system on the server 22 as they happen and replicate file and byte-level changes to the backup server 12. In particular, as changes are written to the source data files on the server 22, the dynamic replication process would place a copy of these changes into a journal file. The journal file may then be transferred to the backup server 12 and the changes recorded within the journal file may be written into the associated target data files in the replicated data structure. Optionally the dynamic replication process may be run under a continuous schedule of frequency, thereby continuously identifying changes to the source data files and replicating those changes in the corresponding target data files.

To this end, as shown in FIG. 1 each server having source data files that are to be replicated on the backup server 12 may include an agent process 30 that runs as a process on the server and that monitors accesses to source data files made through the operating system. In one embodiment, the agent process 30 is a file system filter (FSF). An FSF may be a driver layer that sits above a file system driver stack. This filter interface allows the backup system 10 to "hook" a file system and intercept input/output traveling between the operating system and the underlying drivers. The filter may pass the data unmodified, and redirect the data to the journal file as well as perform some time stamping operations and grouping operations that organize the captured data into a format suitable for use by the backup system when processing the journal file. The design and development of such an FSF follows a principle well known in the art of computer science, including those set forth in *Windows NT File System Internals: A Developer's Guide,* Nagar Rajeev, O'Reilly & Associates (September, 1997), as well as from other sources.

It will be apparent of those skilled in the art that the agent process may be in one embodiment a Windows NT service, and for purpose of clarity a Windows NT service embodiment of the agent process will now be described. Such a service is generally understood as a user-mode process that implements the service controller specification of the Windows NT operating system. The service controller is generally understood as the component of the system that controls starting, pausing, stopping, and continuing services for a system. The service controller typically also starts, stops (loads and unloads) device drivers and provides a common user interface and application programming interface for services and device drivers.

Figure 5:
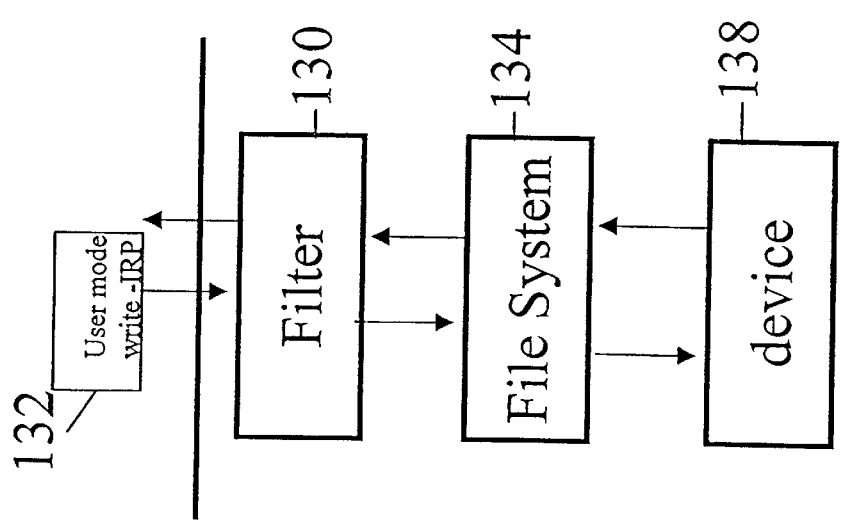
FIG. 5 depicts one embodiment of an agent process suitable for use with the system depicted in FIG. 1.

One such agent process 30 suitable for use with the system depicted in FIG. 1 is shown in FIG. 5. The depicted agent process may start automatically upon server startup, similar to a UNIX daemon process, or VMS detached process. Optionally, the agent process 30 may be started, paused or stopped under the control of the back up server 12, or under the control of another process, such as the synchronization replication process 40.

Specifically, FIG. 5 depicts in more detail a Windows NT version of an agent process 30 according to the invention. Specifically, FIG. 5 depicts the agent process as a file system filter 130 that is capable of intercepting an IRP generated by a use mode application through a user action, wherein the IRP would write data to the NT file system. The FSF 130 intercepts the request to write the data carried within the IRP 132. The FSF 130 than passes the request to the NT file system 134 to allow the data to be written to the device 138, which can be a hard disk drive. If the data is successfully written to the device 138, the device driver returns through the file system 134 and through the filter 130 an IRP that indicates the write was successful. The data for the IRP may than be copied by the FSF 130 to a journal file which is monitoring the file for which the data write has occurred. Once the data has been written to the journal file or to multiple journal files responsible for monitoring such write operations, the IRP is allowed to complete and the user application is notified that the write has been successful.

Figure 6:
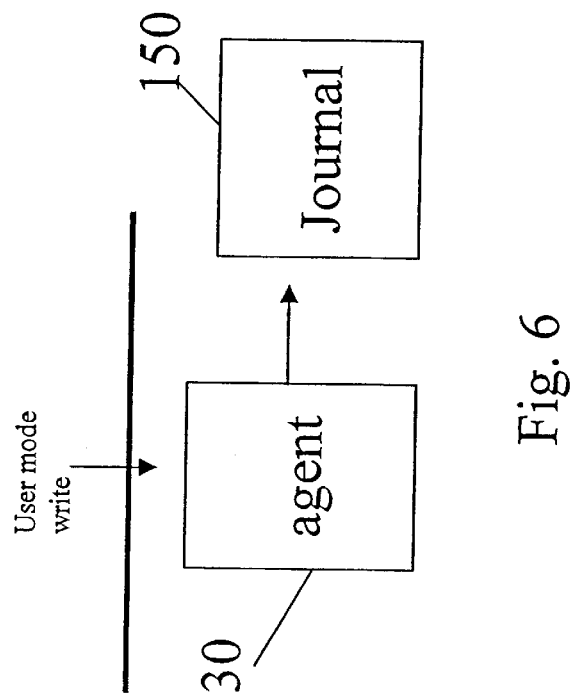
FIG. 6 depicts an agent such as an agent depicted in FIG. 5 creating a journal file of changes to a source data file.

FIG. 6 depicts that the agent process 30 may respond to a user mode write operation by capturing the write operation, passing the write operation through to the file system, but creating a copy of the captured data stream within the depicted journal file. The agent process 30 can then store the changes within the journal file in a process that time stamps the recorded changes to provide delimitations which indicate the time of occurrence for certain changes to a particular source data file. In this way the journal file may maintain a record of the source data files that are being modified in the order in which these modifications take place.

The agent process 30 can detect that a journal file contains information and can transfer the journal file to the backup server 12. There the backup server 12 can employ the information stored within the journal file to play it through the operating system as if the user mode write occurred on the backup system. Optionally, the backup system may process the journal file to identify the time stamp information and to ensure that changes and modifications made to a target data file occur in the write order sequence of the corresponding source data file.

Additionally, the backup process 40 running on the backup server 12 may process the journal file to identify whether a file being modified is part of an identified transactional group specified within the profile file 50. If such a transactional group data source file is detected by the backup process 40, the backup process 40 may modify the transactional set of source data files in a unitary operation.

Figure 7:
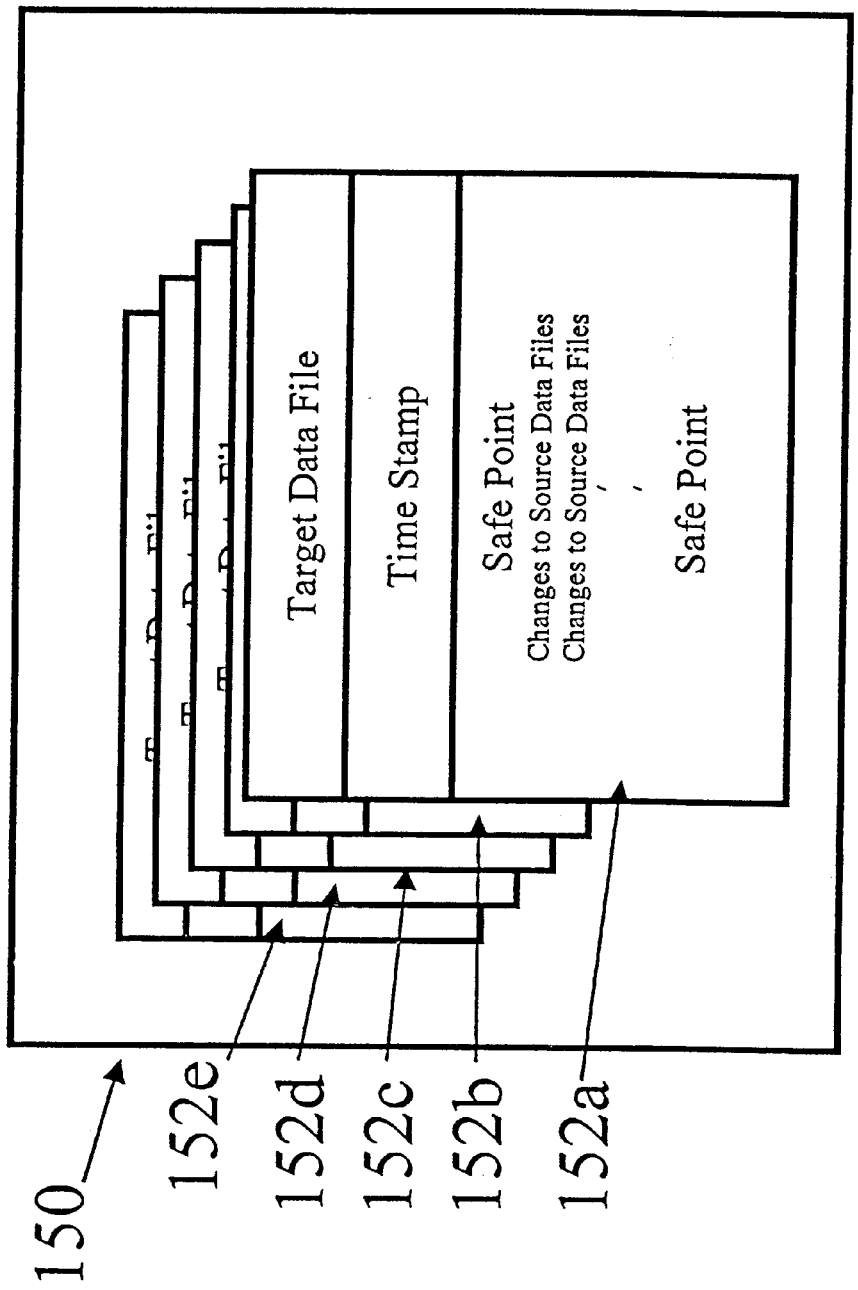
FIG. 7 depicts pictorially one example of a Journal File.

Turning now to FIG. 7 a more detailed view of a journal file 150 is presented. The journal file 150 presented in FIG. 7 includes a plurality of different records, 152a–152e, each record being associated with a set of changes made to a particular source data file. As shown in FIG. 7, for each data file an entry can be made indicating the identity of the corresponding target data file for the respective source data file, a time stamp that provides time and date information, and a field that includes a set of changes that were made by a user mode application to the underlying source data file. The time stamp information can include a plurality of time stamps each of which can be associated with one or more of the changes recorded within the journal file record.

As changes are detected to source data files, the information is stored within the journal file and the journal file is transmitted to the backup server 12 where it can be processed by a transaction processor. The transaction processor can process the change information stored within a record associated with a particular target data file. The transaction processor will process the change information to identify a set of transactions that may be applied to the target data file to achieve a transactionally safe operation. In the embodiment being described herein, the processing of change information within a journal file 150 is carried out on the target system, thereby allowing the source system to provide in real time changes being made to the source data files. The target system processes these changes to create in real time replicated images of the different versions of corresponding source files. This provides for real time tracking of modification of the source data files. In making these changes, the transaction processor processes the changes made to a file to identify safe points in the history of these transactions during which a file write, such as to a tape medium, may be made.

More specifically, each of the data records 150a–150e depicted in FIG. 7 includes information provided by the agent process 30 that allows the transaction processor on the target system to identify safe points. For example the agent process 30 may include a time stamp process that will write into the journal file a time and date signal that is representative of the time and date of a recorded change to the source data file. This allows the journal file to provide information representative of when changes occurred thereby allowing the transaction processor to determine the interval of time between subsequent changes. Thus the transaction processor may have a timer process that allows it to write a safe point signal into the journal file in response to an indication that a data source file has been inactive for a predetermined period of time. The agent process can also include other information within the journal file such as whether any write locks are indicated for the file being monitored, whether an operating system flush operation has been located, the open and closed status of the source data file, and other such information. An alternative embodiment, the status of a file or the operation s of the operating system such as, a flush operation, can be monitored by the backup system or another independent process. Additionally, in certain optional embodiments the agent process 30 includes a user selection process that allows a use to write a safe point signal into a journal file in response to a use command to indicate a safe point marker within the journal file. This of course allows a user to create safe points for directing or forcing the writing of data at the back up system. Additionally, the agent process can be responsive to other computer processes that indicate a safe point marker should be place within the journal file to force a write operation on the backup server 12.

The transaction processor can process the change information within the journal file record to identify the safe points. The transaction processor may than apply the changes that are delimited by safe points to the target source file for performing a transactionally safe write operation. Once the target file has been written to tape, the catalog process 42 can indicate its location its security history information, and any other suitable data that should be recorded. In an optional embodiment, it will be understood that the transaction processor may analyze safe points and prioritize the identified transactions to select transactions that occur across multiple safe points. In this way, the transaction processor can group together multiple transactions, each of which are delimited by safe points, and write the multiple transactions in a single operation to the target data file.

Similarly, the transaction processor may consider the changes of multiple source data files to make a determination of transactional safety. For example, in one embodiment the policy manager places safe points within a plurality of journal files, each journal file being associated a respective source data file. The safe point provide the transaction processor with information for coordinating the write operation for the changes to these plural source data files. For example, the policy manager can provide safe points within the journal files a plurality of source data files that have been identified by the user to the consult process as being part of a single transactional group or set. To this end the policy manager can place safe points within the journal files that allow the transaction processor to identify that before writing any one of the files in the transactional set, the changes for other members of the set are to be determined and grouped together. In this way the transaction processor may coordinate the writing and storage of multiple related data files, to keep associated edits to these files within the same version of each of these files.

In a further embodiment, the system may include a restore process that will restore selected target data files as a function of the time stamp signal associated with that data file, to allow a user to employ time and date information for restoring data to the source data files. Thus, the restore operation may employ date and time information to restore the version of a source data file that existed at one point in time, or the version of a plurality of source data files that existed at a specific point in time. This of course greatly facilitates the retrieval of data from the backup server 12 and allows a user to perform a time slice operation to restore the versions of files that existed at a particular moment in time. Thus, the backup system will provide for transaction accurate restoration processes. For example, if 3 files (A, B, C) are backed up at point 1 in time, and then B and C change at point 2 two, followed by A and C at point 3, I can select any point 1, 2, or 3 and get a collection of A, B, C that is transaction accurate (for example, restore point 2 in time selects B and C from point 2, and then A from point 1; A from point 3 is ignored since it is newer than point 2 in time).

It will be noted that in the embodiment described above the backup server 12 is operating under the control of the Windows NT operating system and so is the data server. Accordingly, the journal files are capturing IRP packets that are in a format generally suitable for being played both on the data server and the backup server. However, it will be understood that in alternative embodiments the data servers may be UNIX systems or systems running another type of operating system. Similarly, the backup server may also be a server running an operating system that is different from Windows NT and different from the operating system of the data server. In this embodiment, the transaction processor would include an interpreter that could map operating system or curl mode operations captured in the journal files for the data server to operating system calls or kernel operations for the operating system for the backup server. Other enhancements and modifications of the systems and methods described herein can be practiced with the invention without departing from the scope hereof.

Turning again to FIG. 1, the systems and methods described herein may transfer data from thousands of files during a synchronization operation. Such an operation may consume substantial amounts of the available network resources, such as network bandwidth and buffer capacity. In practice, the system 10 of FIG. 1 will use by default as much available network bandwidth as it needs to back up or restore data. However, in one optional embodiment, the system 12 allows a user to specify the maximum amount of network bandwidth that it may consume when backing up or restoring data. For example, the user may choose to set a network consumption limit in certain applications, such as if the user is backing up data across a WAN, or the Internet or if bandwidth availability is limited during certain times.

To this end, the back up server 12 may provide a bandwidth control process 44 that may be accessed through the console process 24. In the depicted embodiment, the bandwidth control process is shown as operating on the back up server 12, however it will be apparent to those of skill in the art that the bandwidth control process 44 may be located on the data servers 18, 20, 22, or on both the data servers 18, 20, 22 and the back up server 12. The user may employ this process 44 to set a network consumption limit for each backup policy and restore operation. When setting this option, the user may select the bandwidth that is available between the source and backup systems, and specify a consumption limit to be allocated to the synchronization and/or dynamic replication processes. If multiple network links are available between the systems, the user may specify the slowest link. Further, the bandwidth control process 44 may include a process for determining, either dynamically, or historically, the available network resources, including network bandwidth and buffer availability, for a given time. The determined resources may be provided by the user through the console process 24, or automatically employed by the bandwidth control process 44 for selecting network consumption limits. The design and development of such a process for determining available network resources follows from principles well known in the art, including those set forth in U.S. Pat. No. 5,920,701, Scheduling data transmission, by Miller, C. Kenneth et al., the teachings of which are herein incorporated by reference.

Once the consumption limit is set, the bandwidth control process 44 may throttle the bandwidth usage of the agents 30, synchronization replication process 40 or any replication process by limiting the amount of data to be placed on the network 10 per unit of time. To this end, the bandwidth control process 44 may calculate the bandwidth usage limit based on the maximum percentage of bandwidth the user selected for the operation and the type of network specified. Optionally, the user may vary the network bandwidth consumption for a particular policy over the course of a week. Thus a user could choose to limit consumption during the working hours and allow unlimited consumption at other times.

If multiple jobs are running concurrently between systems, the bandwidth control process 44 may use the greatest consumption value assigned to the jobs during the time they are running. As jobs finish, the process 44 may automatically adjust its bandwidth usage to use the greatest value assigned to the jobs that are still running. For example, assume the following jobs are running concurrently:

EXAMPLE 1

| Job | Network Consumption |
|---|---|
| Job 1 | 50% |
| Job 2 | 75% |

-continued

| Job | Network Consumption |
|---|---|
| Job 3 | 30% | the process 44 may use the greatest consumption value of these active jobs, which is 75%. When Job 2 completes, the process 44 throttles its bandwidth usage to 50%, as both Job 1 and Job 3 are still running.

To control the bandwidth employed by the system 10, in one practice the bandwidth control process 44, for each policy set by the user, calculates a transmit window. A transmit window is be understood as the theoretical time to transmit the packet plus a delay time between each packet. At runtime, the actual time (T1–T0) to transmit and the transmit window (P) may be used to determine the length of the delay as follows:

Get start time (T0)
Send data
Get stop time (T1)
Delay (P–(T1–T0))

If the administrator chooses a network capacity that is less than the actual line capacity, the process 44 may attempt to emulate the selected network capacity.

This algorithm allows the process 44 to minimize, or substantially minimize, network overhead costs by keeping the packet size sufficiently large and increasing the time delay for the low percentage, low capacity cases. The process 44 distinguishes between 100% of network capacity and unlimited bandwidth. To determine the transmit window, the following calculations are employed:

Determine the packet size, in bytes, by a table lookup based upon network capacity.

Network Capacity < 10 kbits/sec → 1024 byte/packet
Network Capacity >= 10 kbits/sec or <100 kbits/sec → 2048 bytes/packet
Network Capacity >= 100 kbits/sec or <1000 kbits/sec → 4096 bytes/packet
Network Capacity >= 1000 kbits/sec or <10000 kbits/sec → 8192 bytes/packet
Network Capacity >= 10000 kbits/sec or <10000 kbits/sec → 65536 bytes/packet
Network Capacity >= 100000 kbits/sec → 65536 bytes/packet Given the packet size, determine the theoretical time to transmit the packet at 100% capacity. First normalize the packet size to kbits, and then calculate the time to transmit.

Packet Size in kbits=Packet Size*8/1024

Time to Transmit=Packet Size in kbits/Network Capacity in kbits/sec*1000 ms

The time to transmit is represented in milliseconds.

Determine the effective rate, or the rate that we can optimally transmit the percentage of the network capacity requested over a given time period (60 seconds for speeds less than 100 mb, 10 seconds for speeds greater). First normalize the network capacity to bytes per minute. Then calculate the effective rate by taking a percentage of the normalized network capacity:

Capacity in bytes/period=(network capacity*1024)/8*period in seconds where 1024 represents the number of bits in one kilobit, and 8 represents the number of bits in a byte.

Effective Rate=(Capacity in bytes/period*Percentage of utilization)/100

The effective rate is represented in bytes/period.
Determine the number of packets to send within the time period:

Packets to Send=Effective Rate/Packet Size

If the result is 0, set Packets to Send to 1

Calculate the time delay to fill in the gaps between buffer transmissions.

Time Delay (time period in ms−(Packets to Send*Time to Transmit))/Packets to Send The expression Packets to Send*Time to Transmit represents the total transmission time during the one minute time period.
Finally, calculate the transmit window by adding the theoretical time to transmit and the time delay.

Transmit Window=Time to Transmit+Time Delay

EXAMPLE 2

This example is provided for 10% of a 56 kbit line. The packet size lookup will produce a packet size of 2048 bytes. The packet size in kbits is calculated as:

2048 bytes*8 bits/byte/1024 bits/kbits=16 kbits

The time to transmit in milliseconds is calculated as:

16 kbits/56 kbits/sec*1000 ms=286 ms

The capacity in bytes/period (60 second period) is calculated as:

((56 kbits/sec*1024 bits/kbits)/8 bits/byte)*60 secs/min 430080 bytes/min

The effective rate is calculated as:

430080 bytes/min*10%=43008 bytes/min

The packets to send is calculated as:

43008 bytes/min 2048 bytes=21 packets

The time to delay is calculated as:

(60000 ms−(21 packets*286 ms)/21 packets=2571 ms

The transmit window is calculated as:

286 ms+2571 ms=2857 ms

Thus, the process 44 calculates a packet size of 2048 bytes and a potential time delay of 2571 ms between each packet. The transmit window is 2857 ms.
Note that at 1 GB speed, no matter what percentage of network capacity the user selects the process 44 will not be able to approach that speed with the maximum packet size. By modifying the algorithm to use larger packet sizes, the process 44 can begin to approach the effective rate; however, diminishing returns may arise.

Similarly, the systems and methods described herein may include processes for monitoring the availability of other network resources, such as buffer availability across the different nodes on a path through the network. Moreover, the bandwidth control process 44 may include a coalescence process that operates with the network bandwidth control process 44, to reduce the amount of data to be sent to the target/backup system when the data appears to exceed the available network resources, such as bandwidth. In this case, the data is stored on the source system in a buffer/journal and transmitted over the network at the available/requested speed. Since the backup process is capturing changes in real-time, it is possible for the same piece of information to be modified multiple times, and only the most recent version of the same data is required for backup. Rather than saving all possible changes to the same data in the journal, and waiting for available network bandwidth to send all possible changes, the coalescence process can be used to merge all of the changes, and transmit only the most recent image of the data. This process may be similar to what would happen on the target system when the changes are played; the target system would overwrite prior changes made with the more recent changes, resulting in a single image of the most current data. The coalescence process performs this before sending the data to the target system by analyzing the journal/buffer, looking for changes to same data regions, and eliminating the changes that are old and overwritten. The result is a smaller amount of data that needs to be transmitted to the target system.

More specifically, the coalescence process may process the journal file 150 to examine its contents for duplicate data segments, such as data segments as being the same file, and covering the same byte range, like C:\DIR\MYFILE.DAT, bytes 30–65. When finding a duplicate, the coalescence process would remove the older copy, and retain the newer version. In a further embodiment, the coalescence process would build a map of all files and byte ranges that have been modified. By using this map, the coalescence code would be able to identify overlapping regions and retain only the best data. For example, for a file the following writes occur:

Time point A:A 12 byte write at offset 10 (10–22)
Time point B:A 5 byte write at offset 8 (8–13)
Time point C:A 10 byte write at offset 20 (20–30)

The three writes, taking up 37 bytes, could be converted into a single buffer of 22 bytes, by using the above map, and determining that a new image could be created from point B (bytes 8–13), point A (bytes 14–19), and point C (bytes 20–30).

It will be understood by those of skill in the art, that the systems described herein are representative of the invention and not limiting in any way. Moreover, for purposes of clarity, from time to time the systems and methods have been described as having "an" element, or "a" step, but it will be understood, that as appropriate the term "a" and "an" will be understood to mean at least one.

The systems and methods described above may be realized as a software components operating on a conventional data processing system such as a UNIX, or Windows NT workstation. The processes may be implemented as a C language computer program, or a computer program written in any high level language including C++, Fortran, Java or Basic. The development of such processes follows from principle known to those of skill in the art, including those set forth in, for example, Stephen G. Kochan, *Programming in C,* Hayden Publishing (1983). Moreover, although the figures graphically depict the agent processes 30, synchronization replication process 40 and other processes as functional block elements, it will be apparent to one of ordinary skill in the art that these elements can be realized as computer programs or portions of computer programs that are capable of running on the data processor platforms to thereby configure the data processors as a system according to the invention.

Those skilled in the art will know or be able to ascertain using no more than routine experimentation, many equivalents to the embodiments and practices described herein. Accordingly, it will be understood that the invention is not to be limited to the embodiments disclosed herein, but is to be understood from the following claims, which are to be interpreted as broadly as allowed under the law.

I claim:

1. A system for creating back up files for data files stored on a computer network, comprising
    a back up server having a target data file,
    a data server having
        a source data file associated with the target data file, and
        an agent operating on the data server for capturing and recording changes to the source data file as the source data file is being modified and for detecting and recording safe points capable of identifying one or more of the recorded changes as part of a related transaction,
    a dynamic replication process for transmitting a journal file from the data server to the back up server and capable of processing the journal file for altering the target data file to mirror changes made to the source data file, and
    a transaction processor for processing the safe points to direct the operation of the dynamic replication process to alter the target data file as a function of the identified transaction.

2. A system according to claim 1, wherein the agent includes a time stamp process for writing to the journal file a time and date signal representative of a time and date of a recorded change to the source data file.

3. A system according to claim 1, wherein the agent process includes a process for checking the open status of the source data file for writing in the journal file a file closed signal representative of detecting a file close status for the source data file.

4. A system according to claim 1, wherein the transaction processor includes a timer process for writing a safe point signal to the journal file in response to an indication the data source file has been inactive for a predetermined period of time.

5. A system according to claim 1, wherein the agent process includes a lock detect process for writing a lock detect signal to the journal file in response to an indication a file/record locking status is set off the data source file.

6. A system according to claim 1, wherein the agent process includes a flush detect process for writing a flush signal to the journal file in response to an indication a flush operation has been performed for the data source file.

7. A system according to claim 1, wherein the agent process includes a user selection process for writing a safe point signal to the journal file in response to a user command to place a safe point marker in the journal file.

8. A system according to any of claims 3, 4, 5, 6 or 7 wherein the transaction processor processes safe points within the journal file to prioritize the identified transactions to select a transaction for altering the source file.

9. A system according to claim 1, further including a policy manager for placing safe points within a plurality of journal files for coordinating the operation of the transaction processor to process plural target files as a single logical unit of data.

10. A system according to claim 1, wherein the transaction processor includes a timer process for processing journal files at a predetermined interval.

11. A system according to claim 10, wherein the transaction processor directs the dynamic replication process to write changes at predetermined intervals to target data files having corresponding source data files with a closed file status.

12. A system according to claim 1, wherein the transaction processor directs the dynamic replication process to write changes to the target data file based on an indication of a file/record locking status set off for the data source file.

13. A system according to claim 1, wherein the transaction processor directs the dynamic replication process to write changes to the target data file based on an indication of a flush operation has been performed for the data source file.

14. A system according to claim 1, wherein the transaction processor directs the dynamic replication process to write changes to the target data file based on an indication of a user command to place a safe point marker in the journal file.

15. A system according to claim 1, further including a back up service responsive to a safe point in the journal file, for storing the target file on a long term storage medium.

16. A system according to claim 1, including a catalog process for time-stamping to a catalog file a time signal for indicating the date/time of a most recent transaction that was written to a target data file or a plurality of target data files.

17. A system according to claim 16, further comprising a restore process for restoring selecting target data files as a function of the time stamp signal, to allow a user to employ time and date information for restoring data to the source data file or a plurality of source data files.

18. A system according to claim 16, wherein there are a plurality of source data files and target data files, the system including a time-slice processor, for allowing the user to employ time information for restoring a group of the target data files as a function of the time signal.

19. A system according to claim 1, wherein the agent process includes a process for allowing a computer process to write a safe point signal to the journal file.

* * * * *